Figure 1:
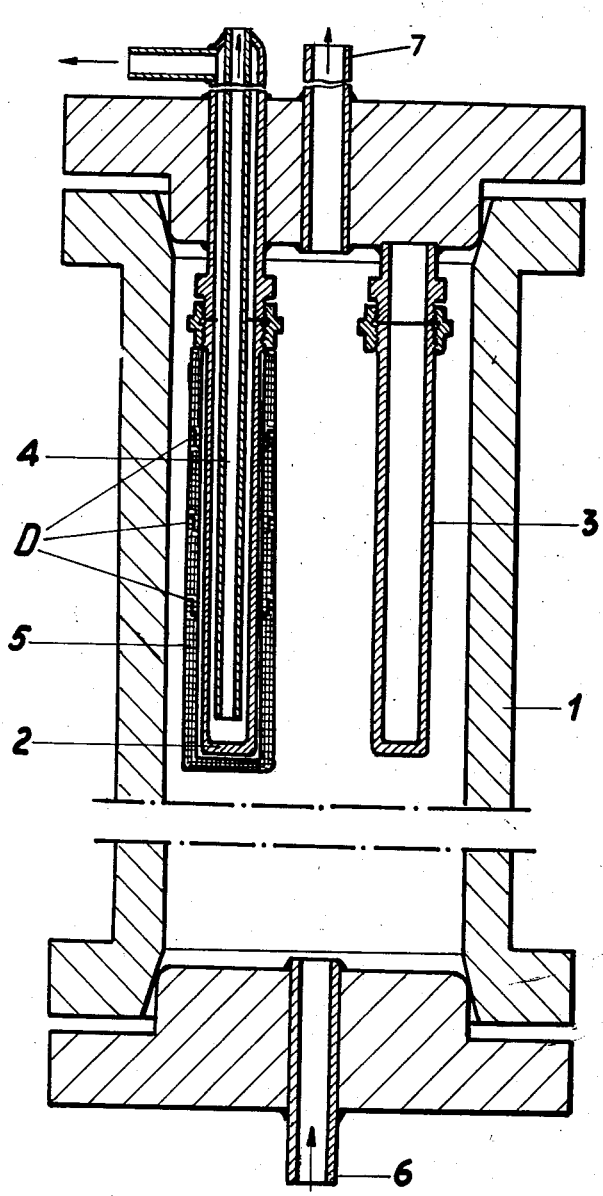

Jan. 7, 1964  G. MARULLO ETAL  3,116,978
APPARATUS FOR PREPARING CARBOXYLIC ACIDS AND
DERIVATIVES THEREOF BY CARBONYLATION
Filed July 13, 1959  2 Sheets-Sheet 1

INVENTORS
Gerlando Marullo
Marco Agamennone
Luigi Corsi

INVENTORS
Gerlando Marullo
Marco Agamennone
Luigi Corsi

United States Patent Office 3,116,978
Patented Jan. 7, 1964

3,116,978
APPARATUS FOR PREPARING CARBOXYLIC ACIDS AND DERIVATIVES THEREOF BY CARBONYLATION
Gerlando Marullo and Marco Agamennone, Novara, and Luigi Corsi, Milan, Italy, assignors to Montecatini Società Generale per l'Industria Mineraria e Chimica, Milan, Italy
Filed July 13, 1959, Ser. No. 826,501
Claims priority, application Italy Aug. 1, 1958
3 Claims. (Cl. 23—252)

The present invention relates to an improved process for preparing carboxylic acids and derivatives thereof by carbonylation, and to an apparatus which results in a substantial improvement in the process.

Processes are known for preparation of carboxylic acids by carbonylation of alcohols, ethers, esters, olefins, acetylenic compounds, and lactones, by operating in the presence of catalysts such as hydrohalogenic derivatives and a metal capable of forming carbonyls at temperatures in the range of 100 to 350° C. under pressures higher than 25 atm.

Of special interest is the preparation of acetic acid from methanol and carbon monoxide by processes which differ considerably from each other in respect to the catalyst and the working conditions. The processes are summarized as follows:

(a) Liquid-phase reaction with catalysts comprising compounds of nickel, cobalt or iron, such as the salts or carbonyls, activated by a halogen, preferably iodine, either free or combined, under a pressure in the range of 150–400 atm. and at a temperature of between 200° and 350° C.

(b) Gas-phase reaction with the use of supported nickel iodide as a catalyst in the presence of nickel carbonyl and methyl iodide at temperatures between 150 and 200° C. and under pressures higher than 10 atm.

(c) Liquid-phase reaction with catalysts comprising cobalt and compounds thereof, in the absence of halogens, at temperatures of between 150 and 300° C. and at between 200 and 1500 atmospheres pressure.

Also significant is the production of adipic acid by carbonylation of butandiol or tetrahydrofurane in the presence of water, by operating under pressures between 50 and 400 atm. at a temperature higher than 100° C., in the presence of hydrohalogenic derivatives such as organic and inorganic iodides, chlorides, bromides, activated or not with compounds of metals such as bismuth and copper. These processes, despite the fact that they have special interest for large scale application in chemical industry, have not found wide practical realization due to the high corrosion which the usual corrosion-proof materials, such as stainless steel, copper, etc., undergo in the process. This corrosion is caused by the contemporaneous presence of carboxylic acids and hydrohalogenic derivatives at high pressures and temperatures. In fact, for the practical realization of said processes it had been suggested to employ such very expensive materials as platinum, gold, and tantalum. In the preparation of acetic acid from methanol and CO according to the reaction mentioned under (a), under practical conditions we found the corrosion rate for steel 832 SK to be 250 g./m.²/day. With mixtures of acetic acid, water, and methanol at 200° C., under the reaction conditions cited under (c), tests on a number of types of stainless steels resulted in the following rates of corrosion:

| Steel type— | Corrosion g./m.²/day |
| --- | --- |
| 832 SK | 30 |
| V₂AS | 25 |
| 832 MV | 60 |
| 18-8-S | 70 |
| V₄AE | 40 |

It is evident that the high rate of corrosion renders it practically impossible to use such materials for the construction of apparatuses for the processes in question. Moreover the impurities which are brought into the solution in this way cause a considerable decrease in the yield and purity in said processes. To overcome this difficulty it was proposed to use high chromium alloys now on the market. From a study of the results of use of alloys of this type it appeared that even Tastelloy C under certain reaction conditions, and especially when the reaction is carried out continuously, undergoes considerable corrosion when, in order to increase the specific productivity, the process is carried out at higher temperatures and in the presence of high amounts of iodine derivatives. For instance, Hastelloy C specimens were exposed to the action of the reaction mass in a continuous reactor employed for production of acetic acid, from methanol and CO, in the range of 10 kg. per day per reactor liter, operating at 310° C. and 300 atm., with a feeding mixture consisting of:

| | Percent |
| --- | --- |
| Methanol | 83 |
| Nickel iodide | 3 |
| Nickel carbonyl | 14 |

The specimens showed a weight decrease, caused by corrosion, of 20 g./m.²/day. A principal object of the present invention is to reduce to a minimum the corrosion of the reactors made of alloys comprising one or more metals, such as nickel-molybdenum-chromium-iron alloys, under the most drastic reaction conditions.

Another object of the invention is to minimize corrosion of reactors made of other metals, for example of a reactor vessel having walls or interior surfaces of titanium, especially when employed for the types of reactions described above.

According to one aspect of the invention, it has been found, surprisingly, that the corrosion of the autoclaves employed for carrying out reactions according to paragraphs (a), (b) and (c) and made of or lined with alloys comprising Ni—Mo—Cr—Fe, with small amounts of other elements such as wolfram, copper, manganese, vanadium, and cobalt, can be lowered or markedly decreased if the reactor walls are lined with an acid-proof material and the outer walls of the reactor are contemporaneously cooled. The high degree of corrosion caused by reaction mixtures of this type appears to be due both to the action of the carboxylic acids, which are present at high temperatures, and to the presence of iodine, which seems to cause the formation of free hydrochloric acid during the reaction. A considerable lowering of the temperature of the reactor wall, and of the liquid in direct contact therewith, is obtained by using the acid-proof lining and the cooling system suggested in this invention. This results in a marked decrease in the corrosion.

It is known that the carbonylation reactions are exothermic. The formation of acetic acid from methanol and CO is accompanied by the development of 24 kcal. per mole of acid. The formation of adipic acid from tetrahydrofurane, water and CO yields 70 kcal. per mole of acid, etc. Therefore, in the industrial execution of the reaction, it is necessary to remove heat from the reaction mass. It is feasible to keep said mass at the reaction temperature even by cooling the reactor walls, if the heat transfer towards the external space is limited by a suitable insulating lining. The adoption of the features of the present invention favours the reaction instead of delaying the same.

As insulating material, glass, and acid-proof ceramic materials comprising silicate of aluminum, iron, zirconium, etc. can be used. In some cases, especially for the preparation of adipic acid from tetrahydrofurane, water and CO with nickel carbonyl and nickel iodide, Teflon has been used advantageously. At 250° C. it does not evidence any alteration in its physical properties, while, in case of the preparation of acetic acid from methanol and CO at 300° C., it has shown only little alteration in its physical properties and in its structure. Teflon is polytetrafluoroethylene.

In Table 1 are reported the experimental results obtained by us.

Table 1

| Run No. | Reaction conditions | | Carboxylic acid prepared | Corrosion specimens | | Lining thickness, mm. | Cooling | | | Corrosion, g./m.²/day | |
|---|---|---|---|---|---|---|---|---|---|---|---|
| | | | | Material | | | | Temperature, °C. | | | |
| | Temperature | Pressure | | Specimens 1 and 2 | Lining of specimen 2 | | Fluid | Inlet | Outlet | Control specimen 1 | Cooled and lined specimen |
| 1 | 250 | 300 | adipic | Hastelloy B | Acid-proof refractory | 10 | water | 100 | 120 | 8 | 0.5 |
| 2 | 260 | 250 | do | do | do | 15 | do | 40 | 50 | 10 | 0.2 |
| 3 | 290 | 300 | acetic | do | glass Pyrex | 10 | do | 40 | 50 | 12 | 2 |
| 4 | 305 | 300 | do | do | acid-proof refractory | 15 | do | 110 | 120 | 20 | 2 |
| 5 | 290 | 400 | do | do | do | 15 | oil | 40 | 50 | 10 | 0.5 |
| 6 | 295 | 300 | do | Hastelloy C | glass Pyrex | 3 | water | 40 | 60 | 4 | 0.8 |
| 7 | 305 | 400 | do | do | acid-proof refractory | 5 | do | 40 | 60 | 13 | 0.6 |
| 8 | 295 | 300 | do | do | do | 5 | do | 110 | 120 | 3 | 0.5 |
| 9 | 305 | 400 | do | do | do | 12 | do | 110 | 120 | 10 | 0.3 |
| 10 | 290 | 300 | do | do | Teflon | 5 | do | 50 | 60 | 5 | 0.5 |
| 11 | 290 | 300 | do | Hastelloy A | acid-proof refractory | 15 | do | 50 | 60 | 30 | 2.5 |

Figures 2, 3:
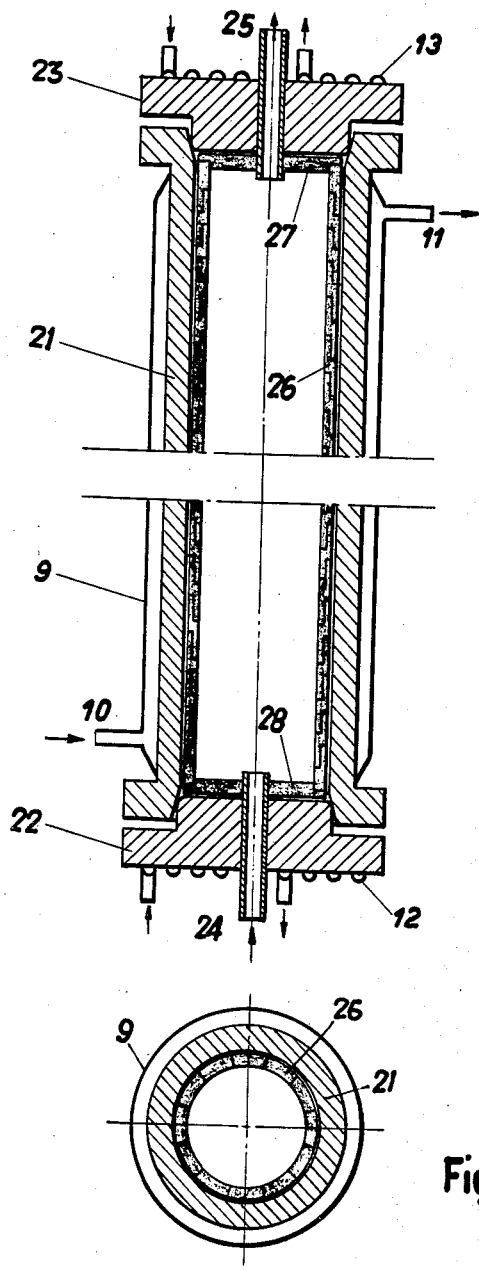

The invention will be described with reference to the drawings, in which FIG. 1 shows a test-apparatus, while FIGURES 2 and 3 show a practical embodiment of a reactor according to the invention.

In the accompanying FIG. 1 is illustrated one embodiment of the apparatus used for determining the corrosion under practical reaction conditions for the preparation of acetic acid from methanol and CO and of adipic acid from tetrahydrofurane, CO and water. The features of this apparatus are readily adaptable for the construction of a reactor, as described below.

An autoclave 1, suited for carrying out the reaction continuously, is fed through the bottom 6 with a mixture of methanol, nickel iodide and nickel carbonyl. From the upper conduit 7 a crude reaction product is discharged, containing 80% acetic acid and 5% methyl acetate in addition to the catalysts and small amounts of water. The yield of the reaction is of about 95%.

Inside the autoclave are placed two weighed tubular, hollow metal specimens designated 2 and 3. Inside one of these specimens, namely tube 2, a forced circulation of cooling liquid, coming from outside the autoclave, is provided by means of an inner metal tube 4 and a pump (not shown). The fluid is kept at a given temperature. A series or stack of bricks made of an acid-proof insulating material 5 is placed around the specimen. The surface D of the interdigitating truncated bricks is not continuous. This permits the penetration of the reaction liquid into the hollow space between the acid-proof lining and the metal specimen in order to balance the pressures onto the two sides of the lining.

The acid-proof layer has not only the function of limiting an intensive renewal of the reaction liquid in contact with the metal surface, but also the essential function of thermally insulating the inner wall of the reactor from the very hot reaction mass.

The second specimen 3 is exposed as a control near the first specimen 2, in the reaction chamber, without the insulating protection and without the cooling device adopted for specimen 2, according to the invention.

This data makes evident the importance of the two conjointly applied expedients of the instant invention, namely, cooling the non-exposed wall and protecting the wall exposed to the reaction liquid. Employed together they reduce the corrosion to a small fraction of that ordinarily occurring. Depending on the thickness and nature of the insulating material used, the corrosion can be lowered to ½₀ of the value presented by the same materials when not cooled and not protected as described herein. By operating under the said conditions, remarkably low corrosion values are shown not only by Hastelloy C, which is a nickel-chromium-molybdenum with a high chromium content, namely 40–70% nickel, 10–30% chromium, and 10–40% molybdenum, but also by alloys having a chromium content lower than 10%, such as Hastelloy B, having the following average composition: 0–10% chromium, 10–40% molybdenum, 0–15% iron, the remainder consisting of nickel, and Hastelloy A. Small amounts of cobalt, manganese, vanadium, carbon, silicon, phosphorus, and sulphur can be present in these alloys, which in certain cases improves their properties.

The apparatus described in the figure is a test apparatus and therefore, in the commercial realization of the process according to the present invention, it is to be understood that the cooling is carried out in the outer wall of the reactor, that is the wall not exposed to the reaction liquid, while the insulating layer is placed inside the reactor, i.e. on the wall exposed to the contact with the reaction liquid.

In FIGURES 2 and 3 is shown a reaction column in the vertical and horizontal sections respectively; this column consists substantially of a pressure metal tube 21, a lower closing flange 22 and an upper closing flange 23. The reactants are introduced through pipe 24 and the reaction products are withdrawn through pipe 25.

The inner wall of the reaction column is protected by a lining, adhering to the inner wall of the metal tube and consisting of refractory bricks 26 mounted by fitting them into each other. The lower and upper closing flanges are protected by two sheets 27 and 28, made of the same insulating material, and shaped as shown in FIGURE 2.

The metal tube is surrounded by jacket 9; in the hollow space between jacket 9 and tube 21 a cooling fluid, introduced through 10 and removed through 11, is circulated.

The outer cooling of both flanges 22 and 23 is assured by circulating the same cooling fluid in two coils 12 and 13 welded on the outer wall of said flanges.

The metal tube 21 and flanges 22 and 23 are entirely made of a Hastelloy-type alloy or of titanium or are made of steel and lined inside with a thin thickness of Hastelloy alloy or titanium.

The insulating lining is not tight, so that the reactants penetrate into the hollow space between the insulating lining and the metal wall through the brick joints. In this hollow space, therefore, there is the same pressure as in the reactor.

It should be noted that, although in the main description reference has been made to special alloys comprising Ni—Cr—Fe with other addition elements, the present invention can be applied, with similarly good results, to reactors comprising a single element, for example, titanium.

We claim:
1. A reactor apparatus for a catalytic synthesis in which the walls of the reactor are subject to the attack of a corrosive acidic liquid reaction mixture under elevated temperature and pressure, comprising a metal reaction vessel, means for circulating a cooling fluid to cool an outer wall of said vessel, a thermally poorly conductive, acid-resistant layer adjacent but spaced from the inside surface of the metal vessel to provide an annular space therebetween, the layer having discontinuities to permit limited access of the liquid reactants in said reactor to the said annular space between the inside surface of the metal vessel and the layer to equalize the pressure upon opposite faces of the layer, and so as to provide a stagnant body of liquid reaction mixtures in said annular space, the layer serving to limit the extent of renewal of the reaction liquid in contact with the inner metal surface of the reaction vessel and to thermally insulate, to a substantial extent, the inner metal surface from the hot reaction mixture.

2. A reactor apparatus for a catalytic synthesis in which the interior wall surface of the reactor is subject to the simultaneous attack of a carboxylic acid and halogen under elevated temperature and pressure, comprising a vessel at least the interior surface of which is formed of an alloy of 40 to 75% nickel, 10 to 40% molybdenum, 1 to 30% chromium, 1 to 20% iron, means for circulating a cooling fluid to cool an outer wall of said vessel, a thermally poorly conductive, acid-resistant layer adjacent but spaced from the inside surface of the metal vessel to provide an annular space therebetween, the layer having discontinuities to permit limited access of the liquid reactants in said reactor to the annular space between the inside surface of the metal vessel and the layer to equalize the pressure upon opposite faces of the layer, said annular space outwardly surrounding the acid-resistant layer, so as to provide a surrounding stagnant body of liquid reaction mixture in said annular space, the acid-resistant layer serving to limit the extent of renewal of the reaction liquid in contact with the inner metal surface of the reaction vessel and to thermally insulate, to a substantial extent, the inner metal surface from the hot reaction mixture.

3. The apparatus defined in claim 1, the reaction vessel being formed of titanium.

References Cited in the file of this patent
UNITED STATES PATENTS

| 2,340,686 | Richards | Oct. 23, 1940 |
| 2,460,052 | Werner | Jan. 25, 1949 |
| 2,710,879 | Snyder | June 14, 1955 |
| 2,727,064 | Thomas | Dec. 13, 1955 |